Patented Aug. 29, 1950

2,520,612

UNITED STATES PATENT OFFICE 2,520,612

DIETHERS OF POLYOXYALKYLENE DIOLS

Frederick Hoffman Roberts, Charleston, W. Va., and Harvey Rowe Fife, Pittsburgh, Pa., assignors, by mesne assignments, to Union Carbide and Carbon Corporation, a corporation of New York No Drawing. Application January 8, 1947, Serial No. 720,930

5 Claims. (Cl. 260—615)

This invention relates to polyoxyalkylene diethers; that is, diethers of polyoxyalkylene diols or glycols. It is more particularly concerned with compositions of relatively high average molecular weight which are complex mixtures of polyoxyalkylene diethers in which the polyoxyalkylene chains are composed predominantly of oxy, 1,2-propylene groups, —$OC_2H_3 \cdot CH_3$—. By way of illustration, diethers in which the oxyalkylene chain is composed exclusively of oxy, 1,2-propylene groups may be represented by the formula $$R^1OC_2H_3 \cdot CH_3\text{—}(OC_2H_3 \cdot CH_3)_{x-2} \cdot OC_2H_3 \cdot CH_3 \cdot OR^2$$

in which $R^1O$— and $R^2O$— are terminal ether groups, and $x$ represents the number of oxy 1,2-propylene groups. Such diether compositions may be obtained, for instance, by the etherification of a polyoxy 1,2-propylene diol composition, or their monoether compositions described in application Serial No. 538,098, filed May 30, 1944, now Patent No. 2,448,664.

From such properties as average molecular weight, refractive index, density, viscosity, rate of change of viscosity with change in temperature, as well as upon theoretical considerations, it appears that the compositions which may be made by etherifying the polyoxy 1,2-propylene diols or their monoethers are complex mixtures of diethers in which the polyoxyalkylene chains are of different lengths and possibly different internal configuration from molecule to molecule, with the ether groups, OR, appearing at the ends of the chains.

By way of illustration, a polyoxy 1,2-propylene diether composition made up of diethers having from 12 to 24 oxy 1,2-propylene groups to the polyoxyalkylene chain would have no less than eleven diether constituents differing from one another in molecular weights, of which the proportion attributable to the polyoxy 1,2-propylene chain would range from 696 to 1276. Assuming each of these different diether constituents to be present in the mixture in the same mol proportion, the composition would have an average molecular weight such that the proportion attributable to the polyoxy 1,2-propylene chain would be about 986. To these values for molecular weights and average molecular weights there is to be added the molecular weight of the terminal groups, $R^1$, $OR^2$, having a minimum value of 46, corresponding to dimethyl ether. The complexity of the mixtures seem to be due not only to differences in molecular weights of the diether constituents, but also to the isomers arising out of the arrangement of the unsymmetrical 1,2-propylene group within the molecules. The higher the average molecular weight of the diether composition the more complex may be the mixture.

Using diethyl sulfate as the etherifying agent, the reaction for producing the ethyl diethers of the present invention from polyoxy 1,2-propylene diols or their monoethyl ethers may be represented by the following equations:

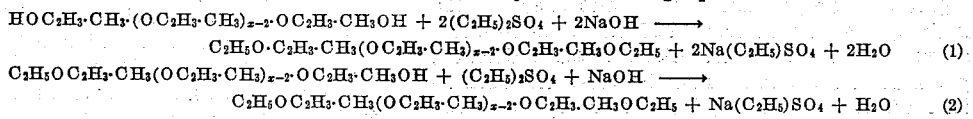

In general, in producing the diether compositions from the polyoxy 1,2-propylene diols, with diethyl sulfate as the etherifying agent, the reaction may be carried out using from two to four mols of the sulfate for each mol of the diol. Sodium hydroxide (solid), or other suitable alkali metal hydroxide, is also used in the proportion of two mols of the hydroxide per mol of diethyl sulfate. A diluent or solvent for the reaction mixture, for instance dibutyl ether or toluene, may also be used, if desired. A mixture containing the diol, the solid caustic and a diluent may be heated to a temperature of about 70° C. or 80° C., and to this heated mixture the diethyl sulfate may be added slowly, with stirring or agitation. The reaction is exothermic, and the temperature is maintained at about 90° to 95° C. by cooling or by regulating the rate of addition of the diethyl sulfate or both. In the absence of a solvent or diluent, the reaction mixture may tend to become gelatinous if the amount of caustic is relatively large and the average molecular weight of the diol is low.

When all of the diethyl sulfate has been added, the temperature of the reaction mixture is held between 90° and 100° C. over a period of three to five hours, with continued stirring to complete the reaction. If the temperature is permitted to increase during this period, some diethyl ether may be evolved. The product is then washed several times with water at a temperature of about 80° C. until a pH range of about 7 to 8 results. If desired, however, the product may be neutralized with carbon dioxide or phosphoric acid to the same pH value. Following the washing, the diether composition will usually be found in the top layer. It is stripped of water, diluent, and any unhydrolyzed diethyl sulfate by heating at a temperature up to 185° C. To assist in the stripping, the pressure may be reduced more or less gradually during the heating to an end pressure of 20 millimeters of mercury, or below. The stripped product may then be filtered to remove salts which have been rendered insoluble by the stripping.

Instead of the diol as a starting material for making the diether compositions, it may be advantageous to use, instead, a polyoxy 1,2-propylene monohydroxy monoether composition, for instance a monobutyl ether. Substantially the same procedure may be followed as for the preparation from the diol, except that the amount of diethyl sulfate employed may be from one to two mols per mol of the monoether.

Another way of making the diether compositions from the diol or the monoether is by means of an organic halide and sodium hydroxide. The reaction may be illustrated in the case of the diethyl ethers by the following equations:

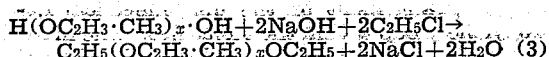
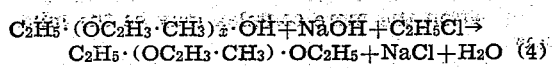

The etherification may be carried out, for instance, using from about eight mols of organic halide per mol of the diol to about four mols of organic halide per mol of the monoether. There is used, in addition, about 1.25 mol of sodium hydroxide (solid) or other alkali metal hydroxide, per mol of organic halide. Because the formation of unsaturated hydrocarbons by dehydrohalogenation of the organic halide is a competing reaction, a large excess of the organic halide is preferably employed. All of the reactants may be charged into a suitable reaction vessel, preferably one equipped with a stirrer and decanting head. A diluent may also be added, for instance toluene. Usually an amount of diluent which is from 30 to 50 per cent, by weight, of the reactants is adequate, but larger or smaller quantities may be used.

The reaction mixture is heated to a temperature which will ordinarily be about 100° to 140° C. for most preparations. The water which is evolved is removed by decantation of the distillate and the heating continued until the rate at which water is evolved attains a minimum. Usually about 20 to 30 hours are required.

Upon completion of the reaction, the product is filtered and washed with water several times at room temperature. The washed product is then stripped by heating it under reduced pressure at temperatures as high as 185° C., as above described, and then filtered to remove any insoluble matter.

The diether compositions of the present invention are characterized by a rate of change of viscosity with change in temperature which is less than that of the diols or their monoethers from which the compositions may be made by etherification thereof. For instance, a polyoxy 1,2-propylene butyl, ethyl diether composition having an average molecular weight of about 950 and viscosities of 8.34 and 1182 centistokes at 210° F. and 0° F., respectively, had a viscosity ratio of 45.6 (20°/210° F.), whereas the polyoxy 1,2-propylene monohydroxy monobutyl ether composition from which the diether was prepared had viscosities of 10.15 and 2935 centistokes at 210° F. and 0° F., respectively, and a viscosity ratio of 82.8 (20°/210° F.). (By the expression "viscosity ratio of 45.6 (20°/210° F.)" or "viscosity ratio of 82.8 (20°/210° F.)" is meant the ratio of the viscosity at 20° F. expressed in centistokes to the viscosity at 210° F.) In other words, the replacement of the hydroxyl group in the polyoxy 1,2-propylene monohydroxy monobutyl ether composition with the ethoxy group resulted in a decrease in the viscosity ratio (20°/210° F.) from 82.8 to 45.6. Replacement of the hydroxyl group with the butoxy group or the octoxy group resulted in a reduction in viscosity ratio (20°/210° F.) to about 51 to 47.5. Although a reduction in viscosity results from the replacement of the hydroxyl group with alkoxy groups having from 8 to 12 or more carbon atoms, the reduction in viscosity ratio is the greater with the lower alkoxy groups having eight or less carbon atoms. Additionally, the lower alkoxyl diether compositions have a lower congealing or solidification temperature and are preferred, particularly for low temperature uses, for instance as low temperature lubricants, low temperature pressure transmitting fluids and the like. The diether compositions of the present invention also have the useful property of being miscible with petroleum lubricating oils over a wider range of temperatures than are the diols or their monoethers from which the compositions may be made. For instance, a polyoxy 1,2-propylene monohydroxy monobutyl ether composition having viscosities of 10.15 and 2935 centistokes at 210° F. and 0° F., respectively, and a viscosity ratio (20°/210° F.) of 82.8 was immiscible with an equal volume of a high quality S. A. E. 30 mineral oil at temperatures below 91° C., whereas on replacing the hydroxyl group with the octoxy group to form the butyl normal octyl diether, the composition was miscible with a like volume of the same oil to temperatures as low as 13° C. The oil miscibility of the diether composition increases with increase in length of the carbon chain and also with chain branching in the alkoxy groups thereof.

The polyoxy 1,2-propylene diether compositions are useful for low temperature instrument oils, hydraulic fluids, the lubricating component of low temperature greases, in addition to other lubricating or energy transmitting applications where low temperatures are encountered. They have the advantage of retaining at relatively high temperatures that also are encountered in service, the desirable viscosity value and lubricating qualities which enable them to be used at low temperatures. Among other characteristics of the diether compositions is the property of wetting bearing surfaces, and maintaining a lubricating film under severe conditions of high loads and high rates of shear. By reason of such characteristics, the compositions are useful not only as lubricants but also as cutting oils. The increased miscibility of the diether compositions with hydrocarbon oils is reflected in their ability to retain hydrocarbon sludges in solution, even at low temperatures, when used as a crank case lubricant for internal combustion engines. It also has the advantage of making for greater ease of engine starting at low temperatures. Still another advantage of the oil-miscibility of the diether compositions is their solvent action on organic sludges which tend to accumulate on bearing surfaces, where hydrocarbon lubricants have been used. The removal of the sludge results in lower bearing temperatures and a lessened chance for bearing failure. Furthermore, inorganic impurities having a catalytic action favoring the rupture of the oxyalkylene chain are much less soluble in the diether compositions than in the diols or their monoethers, thus affording a higher stability of the diethers, particularly at elevated temperatures.

The polyoxy 1,2-propylene diethers exhibit also a higher degree of water-immiscibility than do the diols or the monoethers from which diethers may be prepared. They are less water-miscible also than polyoxyalkylene diols and mono and diethers thereof containing a substantial proportion of oxyethylene groups in the oxyalkylene chain.

In general, the higher the average molecular weight of the diether compositions, the less the influence of the size of different aliphatic ether groups on the properties. For instance, in a methyl, methyl diether composition, the weight attributable to the dimethyl ether grouping, $CH_3OCH_3$, would amount to about ten per cent of an average molecular weight of 500, whereas for an octyl, octyl diether, the dioctyl ether grouping, $C_8H_{17}OC_8H_{17}$, would constitute about half.

The compositions with which this invention is more particularly concerned are those in which the portion of the average molecular weight attributable to the oxyalkylene groups is about 800 or more, with an average molecular weight of at least 846 for the polyoxy 1,2-propylene methyl, methyl diether composition and 1042 for the octyl, octyl diether composition, by way of illustration, and with correspondingly higher average molecular weights for the higher aliphatic diethers. For use as metal lubricants, pressure transmitting fluids and base fluids for use with a viscosity reducing diluent and the like, aliphatic diether compositions in which the aliphatic ether groups have from one to eight carbon atoms, are preferred.

The following examples are illustrative:

Example 1

A polyoxy 1,2-propylene methyl, ethyl diether composition having an average molecular weight of about 910, determined ebullioscopically, was made by the action of diethyl sulfate on a polyoxy 1,2-propylene methyl monoether monohydroxy composition having an average molecular weight of about 907, by acetyl value, and a viscosity of 43.6 centistokes (202 S. U. S.) at 100° F.

The diether composition was found to have a viscosity of 29.7 centistokes (139 S. U. S.) at 100° F., and 6.72 centistokes (48.1 S. U. S.) at 210° F., a specific viscosity in benzene solution of 0.1195 at 18° C., a density of 0.9202 at 210° F., and a refractive index of 1.4430 at 20° C.

Example 2

Polyoxy 1,2-propylene ethyl, ethyl diether compositions having average molecular weights of 857 and 1660, determined ebullioscopically, and viscosities of 42.2 centistokes (195 S. U. S.) and 191 centistokes (882 S. U. S.) at 100° F., were made by the action of diethyl sulfate on polyoxy 1,2-propylene dihydroxy compositions having average molecular weights of 1229 and 3259 by acetylation, and viscosities of 88.7 centistokes (410 S. U. S.) and 265 centistokes (1224 S. U. S.), respectively, at 100° F.

The ethyl, ethyl diether compositions were found to have the following properties:

| Mol. Weight | Viscosity, Centistokes | | | Specific Viscosity in Benzene at 18° C. | Refractive Index at 20° C. | Density at 210° F. |
|---|---|---|---|---|---|---|
| | 20° F. | 100° F. | 210° F. | | | |
| 857 | 520 | 42.2 | 9.22 | 0.1425 | 1.4445 | 0.9214 |
| 1,660 | 3,564 | 191 | 32.6 | 0.2885 | 1.4485 | 0.9335 |

The ratios of viscosity at 20° F. to that at 210° F. were calculated to be 55.4 and 109, corresponding to viscosity indices (ASTM) of 160 and 140, respectively.

Example 3

Polyoxy 1,2-propylene butyl, ether diether compositions having average molecular weights of about 935, 950, 1105 and 1470, determined ebullioscopically, and viscosities of 32.8 centistokes (153 S. U. S.), 36.96 centistokes (172 S. U. S.), 69.0 centistokes (319 S. U. S.) and 140 centistokes (647 S. U. S.) at 100° F., were made by the action of diethyl sulfate on polyoxy 1,2-propylene monohydroxy monobutyl ether compositions having average molecular weights of 940, 936, 1193, 1540, by acetyl value, and viscosities of 47.5, 51.4, 87.5, and 176 centistokes, respectively, at a temperature of 100° F.

The butyl, ethyl diether compositions were found to have the following properties:

| Mol. Weight | Viscosity, Centistokes | | | Specific Viscosity in Benzene at 18° C. | Refractive Index at 20° C. | Density at 210° F. |
|---|---|---|---|---|---|---|
| | 20° F. | 100° F. | 210° F. | | | |
| 935 | 311 | 32.8 | 7.44 | 0.1327 | 1.4437 | 0.9125 |
| 950 | 380 | 36.96 | 8.34 | 0.1430 | 1.4450 | 0.9170 |
| 1,105 | 888 | 69.0 | 13.6 | 0.1664 | 1.4470 | 0.9282 |
| 1,470 | 2,027 | 140.0 | 25.6 | 0.2557 | 1.4481 | 0.9309 |

The ratio of the viscosity at 20° F. to that at 210° F. was calculated to be 41.8, 45.6, 65 and 79, respectively.

Example 4

A polyoxy 1,2-propylene butyl, normal propyl diether composition having a viscosity of about 26.3 centistokes (125 S. U. S.) at 100° F. was made by the action of normal propyl bromide and sodium hydroxide on a polyoxy 1,2-propylene monohydroxy butyl monoether composition having an average molecular weight of about 838, by acetylation, and a viscosity at 100° F. of about 37.6 centistokes (175 S. U. S.).

The butyl, propyl diether composition was found to have viscosities of 26.1 centistokes (125 S. U. S.) at 100° F. and 6.14 centistokes (46.3 S. U. S.) at 210° F., a specific viscosity in benzene solution at 18° C. of 0.1131, a density of 0.9077 at 210° F. and a refractive index of 20° C. of 1.4438.

Example 5

Polyoxy 1,2-propylene butyl, butyl diether compositions having viscosities of 39.05 centistokes (181 S. U. S.) at 100° F. and 69.4 centistokes (321 S. U. S.) at 100° F., respectively, were made by the action of normal butyl chloride and sodium hydroxide on polyoxy 1,2-propylene butyl monoether monohydroxy compositions having average molecular weights of about 936 and 1193, by acetylation, and viscosities of 51.4 centistokes (238 S. U. S.) and 87.5 centistokes (404 S. U. S.) at 100° F. and 10.15 centistokes (59.7 S. U. S.) and 15.1 centistokes (78.1 S. U. S.), respectively, at 210° F.

The butyl, butyl diether compositions were found to have the following properties:

| Mol. Weight | Viscosity, Centistokes | | | Specific Viscosity in Benzene at 18° C. | Refractive Index at 20° C. | Density at 210° F. |
|---|---|---|---|---|---|---|
| | 20° F. | 100° F. | 210° F. | | | |
| 960 | 451 | 39.05 | 8.77 | 0.1535 | 1.4458 | 0.9133 |
| 1,250 | 1,046 | 69.4 | 13.69 | 0.1831 | 1.4471 | 0.9208 |

The ratio of the viscosity at 20° F. to that at 210° F. was calculated to be 51.4 and 76.4, respectively, for each of the diether compositions.

*Example 6*

A polyoxy 1,2-propylene butyl, normal octyl diether composition having an average molecular weight of about 950, determined ebullioscopically, and a viscosity of about 40.79 centistokes (189 S. U. S.) at 100° F., was made by the action of normal octyl chloride and sodium hydroxide on a polyoxy 1,2-propylene monobutyl ether monohydroxy composition having an average molecular weight of about 936 at 100° F. and viscosities of 51.4 centistokes (238 S. U. S.) at 100° F. and 10.15 centistokes (59.7 S. U. S.) at 210° F.

The resulting butyl, normal octyl diether composition was found to have viscosities of 426, 40.79 and 8.98 centistokes at temperatures of 20°, 100° and 210° F., a specific viscosity in benzene at 18° C. of 0.1452, and a refractive index at 20° C. of 1.4460. The ratio of its viscosity at 20° F. to that at 210° F. was calculated to be 47.5.

*Example 7*

A polyoxy 1,2-propylene butyl, normal dodecyl diether composition having a viscosity of about 43.95 centistokes (204 S. U. S.) at 100° F. was made by the action of normal dodecanol bromide and sodium hydroxide on a polyoxy 1,2-propylene monobutyl ether monohydroxy composition having an average molecular weight of about 936, by acetylation, and a viscosity of 51.4 centistokes (238 S. U. S.) at 100° F. and 10.15 centistokes (59.7 S. U. S.) at 210° F.

The resulting butyl, normal dodecyl diether composition was found to have viscosities of 43.95 and 9.47 centistokes at temperatures of 100° F. and 210° F., respectively; a specific viscosity in benzene at 18° C. of 0.1555, a refractive index at 20° C. of 1.4478, and a density at 210° F. of 0.8957. The composition was solid at a temperature of 20° F.

The term "viscosity index" as used herein corresponds to the conventional viscosity index calculations for petroleum products and lubricants in accordance with the definitions accepted by the American Society for Testing Materials (see Industrial and Engineering Chemistry (1935), volume 27, pages 82 and 1441).

By the abbreviation or symbol S. U. S. is meant Saybolt Universal seconds as a measurement of viscosity.

The invention is susceptible of modification within the scope of the appended claims.

We claim:

1. A normally liquid mixture of alkyl diethers of polyoxy 1,2-propylene diols having an average molecular weight such that the portion thereof attributable to oxy 1,2-propylene groups is at least 800.

2. A normally liquid mixture of alkyl diethers of polyoxy 1,2-propylene diols in which the alkyl ether groups have from one to eight carbon atoms and having an average molecular weight such that the portion thereof attributable to oxy 1,2-propylene groups is at least 800.

3. A normally liquid mixture of alkyl diethers of polyoxy 1,2-propylene diols in which one of the alkyl ether groups is normal butyl and the other alkyl ether group has from one to eight carbon atoms, and having an average molecular weight such that the portion thereof attributable to oxy 1,2-propylene groups is at least 800.

4. A normally liquid mixture of polyoxyalkylene alkyl diethers preponderantly composed of oxy 1,2-propylene groups and in which the two alkyl ether groups have a total of eight carbon atoms, said mixture having an average molecular weight such that the portion thereof attributable to oxy 1,2-propylene groups is at least 800.

5. A normally liquid mixture of polyoxy 1,2-propylene butyl, butyl diethers, said mixture having an average molecular weight of at least 930.

FREDERICK HOFFMAN ROBERTS.
HARVEY ROWE FIFE.

REFERENCES CITED

The following references are of record in the file of this patent:

UNITED STATES PATENTS

| Number | Name | Date |
|---|---|---|
| 1,614,883 | Davidson | Jan. 18, 1927 |
| 2,425,755 | Roberts | Aug. 19, 1947 |
| 2,425,845 | Toussaint | Aug. 19, 1947 |